United States Patent
Nordal et al.

(12) 
(10) Patent No.: US 6,559,217 B1
(45) Date of Patent: May 6, 2003

(54) PREPARATION OF POLYMER PARTICLES

(75) Inventors: Rolf Nordal, Skedsmorkorset (NO); Svein Tøgersen, Oslo (NO); Preben Cato Mørk, Trondheim (NO)

(73) Assignee: Polymer Systems AS, Lillestrom (NO)

( * ) Notice: Subject to any disclaimer, the term of this patent is extended or adjusted under 35 U.S.C. 154(b) by 0 days.

(21) Appl. No.: 09/958,414

(22) PCT Filed: Apr. 10, 2000

(86) PCT No.: PCT/GB00/01335

§ 371 (c)(1),
(2), (4) Date: Oct. 9, 2001

(87) PCT Pub. No.: WO00/61648

PCT Pub. Date: Oct. 19, 2000

(30) Foreign Application Priority Data

Apr. 9, 1999 (GB) ............................................. 9908164
Mar. 22, 2000 (GB) ............................................. 0007006

(51) Int. Cl.$^7$ ........................... C08J 3/00; C08K 3/20; C08L 9/04; C08L 9/08; C08F 2/16
(52) U.S. Cl. ...................... 524/457; 524/458; 524/460; 526/80; 526/87
(58) Field of Search ................................ 524/458, 460, 524/457; 526/80, 87

(56) References Cited

U.S. PATENT DOCUMENTS 4,530,956 A * 7/1985 Ugelstad et al.

* cited by examiner

*Primary Examiner*—Patrick D. Niland
(74) *Attorney, Agent, or Firm*—Testa, Hurwitz & Thibeault, LLP (57) ABSTRACT

The invention provides a process for the preparation of polymer particles having a mode particle size of at least 50 $\mu$m which process comprises (a) obtaining a first particulate polymer seed material having a mode particle diameter of no more than 50 $\mu$m; (b) using said first seed material, performing a suspension polymerization involving the steps: (i) forming an aqueous dispersion comprising a polymer seed material, an organic compound (e.g. a polymerization initiator) which has a molecular weight of less than 5000 Daltons and a water solubility of less than $10^{-2}$ g/L at 25° C., a stabilizer and optionally an organic solvent (e.g. acetone or a portion of the monomer mentioned below); (ii) allowing said organic compound to diffuse into the seed material to produce an activated seed material; and (iii) contacting said activated seed material with a monomer (e.g. styrene) and with a polymerization initiator and effecting suspension polymerization thereof and (c) optionally impregnating and/or heat treating and/or surface modifying the particulate product of step (b).

17 Claims, 2 Drawing Sheets

PREPARATION OF POLYMER PARTICLES

CROSS-REFERENCE TO RELATED APPLICATIONS

This application is the national phase of International (PCT) Patent Application Serial No. PCT/GB00/01335, filed Apr. 10, 2000, published under PCT Article 21(2) in English, which claims priority to and the benefit of United Kingdom Patent Application No. 9908164.8, filed Apr. 9, 1999, and United Kingdom Patent Application No. 0007006.0, filed Mar. 22, 2000.

This invention relates to improvements in the production of particulate polymers, in particular polystyrene particles.

The process of the invention is especially suitable for the production of EPS beads, but the processes may be used for the preparation of any particulate polymer producible by suspension polymerization, in particular styrenic homo- and copolymers and vinyl homo- and copolymers. Examples of appropriate monomers include vinyl aliphatic monomers such as esters of acrylic and methacrylic acids, acrylonitrile, and vinyl aromatic monomers such as styrene and substituted styrene.

Millions of tonnes of expandable polystyrene (EPS) are produced each year. The EPS is produced in bead form and is used for the manufacture of a wide range of products ranging for example from thin-walled cups to packaging materials to large blocks used in construction.

The different end uses require EPS beads of different sizes, typically as follows:

200–600 μm—Cups and trays
400–800 μm—Thin-walled packaging materials
600–1100 μm—Normal packaging materials
900–2000 μm—Insulation boards and block materials.

EPS beads falling outside these target size ranges are typically considered to be "off-specification" material and command substantially lower prices.

EPS is normally produced by a suspension polymerization process in which styrene is polymerized in the presence of a free radical generator. The polystyrene (PS) beads produced in this way are impregnated with a blowing agent, typically a $C_{1-4}$ hydrocarbon such as pentane, to produce the expandable. polystyrene (EPS) beads.

Suspension polymerization however produces PS beads with a broad size distribution and the PS or EPS beads must be size-classified, i.e. separated into fractions having the appropriate particle size range for the desired end use.

Although variation of the suspension polymerization conditions may allow the EPS producer to optimize the fraction of polymer beads having the particular desired size, e.g. for thin-walled packaging materials, a large proportion of the total bead yield will still be in less desired grades or will be of off-specification sizes.

Sekisui, in GB-A-1416405, describe a process in which the suspension polymerization of styrene is effected in the presence of polystyrene seeds of a size smaller than the desired mode size of the end product.

Typically the Sekisui process may be performed as a two-stage suspension polymerization. The first stage is terminated when relatively small beads, e.g. having a mode size of about 900 μm, have been formed. The small beads are then graded to remove overly small and overly large fractions leaving PS seeds, e.g. having sizes of 400 to 1800 μm, and the seeds are then used in the second of the suspension polymerization stages to yield PS beads having a narrower size distribution about the desired particle size than is achieved in the conventional suspension polymerization. Even this process however yields a product which has a broad particle size distribution and the complexity of the grading procedure is increased since it must be carried out on the smaller particles produced in the first polymerization stage.

The grades of EPS produced by the conventional and Sekisui processes contain a range of particle sizes, e.g. particle diameters differing by several hundreds of micrometers. This has a deleterious effect on the processing of EPS beads into expanded polystyrene products.

In expanded polystyrene product formation, EPS beads are first pre-expanded to produce free flowing expanded particles, typically using steam at a temperature below 100° C., and then tempered in a silo through which air is passed, before being filled into a mould and steamed, typically at 110 to 120° C., to complete expansion and fusion of the particles.

The tempering period is required for the pre-expanded particles to develop the necessary resilience for the moulding process.

The particle size distribution in the EPI beads is not simply replicated in the pre-expanded beads, instead the size distribution is broadened and a broad density distribution is created as under the same conditions the smaller EPS beads will expand less and the larger beads more leading to the tempering silo containing a mixture which includes small high density particles and larger low density particles. Settling out of the smaller higher density particles occurs in the tempering silo resulting in non-uniformity of the pre-expanded particle mixture fed from the silo to the moulds and accordingly to variations in the final densities and strengths of the moulded products. Thus the broad particle size distribution for the graded EPS beads and hence of the pre-expanded particles leads to difficulties in production of expanded polystyrene products and makes the product quality inconsistent and difficult to control.

We have found that it is possible to produce substantially monodisperse (i.e. single sized) polymeric seed particles which can be used in suspension polymerization to generate larger but still substantially monodisperse polymer particles, for example substantially monodisperse EPS particles with a size suitable for one of EPS's typical end uses. This process for polymer particle production is described in WO99/19375. The disclosures of WO99/19375 are incorporated herein by reference.

Since the product is substantially monodisperse, mechanical grading is not required thereby leading to considerable savings in terms of production equipment and process duration. Moreover undesired grades are not produced thereby leading to a considerable increase in effective yield and a reduction in waste. Furthermore the problems associated with a broad particle size range within a graded EPS product are avoided or reduced.

The particle size expansion cycles in the polystyrene particle production process of WO99/19375 are relatively time consuming and we have now found that the process may be accelerated if in at least one expansion cycle the seeds are pre-swelled in a process somewhat similar to the Ugelstad polymerization process described in EP-B-3905 (Sintef) and U.S. Pat. No. 4,530,956 (Ugelstad) the disclosures of which are hereby incorporated by reference.

Polymer beads may be produced by diffusing a monomer and a polymerization initiator (or catalyst) into polymer seeds in an aqueous dispersion. The seeds swell and following initiation of polymerization, e.g. by heating to activate the initiator, larger polymer particles are produced. The maximum volume increase due to swelling and polymerization is normally about ×5 or less. The late Professor John Ugelstad found that the capacity of the seeds to swell could be increased to a volume increase of ×125 or even more if an organic compound with relatively low molecular weight and low water solubility is diffused into the seeds before the bulk of the monomer is used to swell the seeds. The effect is based on entropy rather than particularly on the chemical nature of the organic compound.

Conveniently the polymerization initiator may be used for this purpose. Organic solvents, e.g. acetone or a portion of the monomer, may be used to enhance diffusion of the organic compound into the seeds. This "Ugelstad polymerization process", which is described for example in EP-B-3905 (Sintef) and U.S. Pat. No. 4,530,956 (Ugelstad), may be used to produce monodisperse particles, If necessary carrying out several swelling and polymerization stages to reach the desired particle size.

In a simplified version of the Ugelstad process the enhanced capacity for swelling may be achieved simply by the use of oligomeric seed particles, e.g. where the oligomer weight average molecular weight corresponds to up to 50 monomer units or up to 5000 Daltons.

Thus viewed from one aspect the invention provides a process for the preparation of polymer particles having a mode particle size of at least 50 μm, preferably at least 70 μm, e.g. at least 120 μm, which process comprises (a) obtaining a first particulate polymer seed material (having in one embodiment a mode particle diameter of no more than 50 μm, preferably no more than 40 μm, more preferably no more than 30 μm);

(b) using said first seed material, performing a suspension polymerization to yield a second particulate polymer seed material having a mode particle diameter greater than that of said first seed material, and, if required, using said second seed material, performing at least one further suspension polymerization to yield a particulate polymer seed material having a mode size greater than 50 μm, preferably greater than 70 μm, more preferably greater than 120 μm, whereby the increase in mode particle diameter in step (b) is at least ×2, preferably ×4, more preferably at least ×10, e.g. ×10 to ×15; and (c) optionally impregnating and/or heat treating and/or surface modifying the particulate product of step (b); characterised in that at least one of the suspension polymerizations effected in step (b) involves (i) forming an aqueous dispersion comprising a polymer seed material, an organic compound (e.g. a polymerization initiator) which has a molecular weight of less than 5000 Daltons and a water solubility of less than $10^{-2}$ g/L at 25° C., a stabilizer and optionally an organic solvent (e.g. acetone or a portion of the monomer mentioned below);

(ii) allowing said organic compound to diffuse into the seed material to produce an activated seed material; and (iii) contacting said activated seed material with a monomer (e.g. styrene) and with a polymerization initiator and effecting suspension polymerization thereof.

Alternatively the increase in mode particle diameter in step (b) in the above process may be at least ×1.5, e.g. at least ×1.8.

In the process of the invention, the seeds and the final product are preferably substantially monodisperse.

In the process of the invention, the seed activation stage (steps (i) and (ii)), preferably involves producing an aqueous dispersion of polymer seed which also is an "oil-in-water" emulsion of the organic compound, preferably a polymerization initiator such as dibenzoyl peroxide. The uptake of the organic compound by the polymer seeds may be assisted by the use of an organic solvent in which the organic compound is soluble, e.g. a solvent such as a ketone (e.g. acetone), alkanol, ether, etc. or more preferably a monomer such as a styrene. Where the organic compound is a polymerization initiator, and especially where a monomer is used as a solvent, formation step (i) is preferably effected at a temperature below the activation temperature for the initiator so as to prevent formation of new particles, e.g. at a temperature between 10 and 65° C., preferably between 20 and 55° C., more preferably 25 and 50° C., especially preferably between 30 and 45° C.

Following organic compound uptake, the temperature of the dispersion is preferably raised to a level at which the polymerization initiator is active, e.g. 60 to 100° C., preferably 70 to 95° C., more preferably 75 to 90° C. and the monomer is added, preferably as an aqueous emulsion or as a single monomer phase. For the production of particles with mode sizes up to 80 μm, it is preferred to add the monomer as an aqueous emulsion; for the production of particles with mode sizes above 40 μm, more especially above 80 μm and particularly above 100 μm (e.g. up to 1500 μm), it is convenient to add the monomer as a single phase material.

For both organic compound and monomer, emulsion formation is preferably effected using an intensive mixer, e.g. a pressure homogenizer or a rotor-stator mixer such as an Ultra-Turrax homogenizer, such that emulsion droplets are less than 15 μm, more preferably less than 10 μm in mode diameter.

The polymerization medium preferably contains a polymerization inhibitor in the aqueous phase, e.g. potassium iodide, in order to prevent formation of new particles. The use of potassium iodide substantially eliminates fines and its use forms a further aspect of the invention. Viewed from this aspect the invention provides a process for the preparation of polymer particles by suspension (or dispersion) polymerization, preferably seeded suspension (or dispersion) polymerization, characterized in that a water-soluble polymerization inhibitor, preferably potassium iodide, is used in the aqueous phase. This can be added at the beginning of the polymerization stage (i.e. when monomer is added or when the bulk of the monomer begins to be added), however it is preferable to add further inhibitor during polymerization. The water-soluble initiator may be added to a concentration of for example 1 to 50 ppm by weight, preferably 3 to 30 ppm.

Monomer and initiator addition is preferably effected over a prolonged period, e.a. 1 to 15 hours, preferably 1 to 10 hours, more preferably 1 to 8 hours and the rate of monomer addition may be constant but preferably is increased over that period. Such addition may be batchwise but more preferably is continuous. During addition, the polymerization mixture is preferably stirred.

In at least a final polymerization cycle of the process of the invention, the temperature of the polymerization mixture is preferably increased, e.g. by 10 to 40° C., preferably by 25 to 35° C., towards the end of the polymerization stage to reduce the level of unreacted monomer. The temperature increase is preferably about 0.1 to 2.0° C./min, more preferably 0.2 to 1.0° C./min, and the polymerization mixture is advantageously held at the elevated temperature until analysis shows substantial disappearance of unreacted monomer, e.g. for 30 to 120 minutes.

The monomer, as mentioned above is preferably added as an oil-in-water emulsion; this emulsion preferably comprises water, monomer, initiator (e.g. Trigonox 117 and BPO), and surfactant (e.g. a poloxamer or ethoxylated sorbitan ester surfactant such as Tween 20).

In one preferred embodiment of the process of the invention, especially suitable for production of particles with a mode particle size of 50 to 120 μm, a polymer seed activation and polymerization cycle involves the following steps:

(A) form an aqueous dispersion of polymer seeds containing in the aqueous phase a steric stabilizer (e.g. a cellulose ether or an inorganic compound such as tricalcium phosphate (TCP));

(B) bring the dispersion to 38 to 42° C. and mix in a solution of initiator in monomer (e.g. styrene) using moderate mixing whereby to form an emulsion/solution of the initiator;

(C) allow the initiator to diffuse into the seeds, e.g. for 30 to 120 minutes, preferably about 60 minutes;

(D) bring the "activated" dispersion to a temperature at which the initiator is activated (e.g. 60 to 95° C., preferably 70 to 90° C.), and add an aqueous solution of a polymerization inhibitor (e.g. KI) and begin continuous addition of an emulsion of water, monomer, stabilizer, polymerization initiator and, optionally, an oil-soluble polymerization initiator, and inhibitor;

(E) continue addition of the monomer emulsion, optionally adding further water-soluble inhibitor one or more times; and optionally (F) bring the polymerization mixture to a higher temperature, e.g. 90 to 100° C., to deplete monomer (preferably after monomer addition is completed).

Such activation and polymerization cycles may be repeated to produce polymer particles of the desired size. Preferably, each such cycle will involve a particle volume increase of at least ×5. Thus for example initial polymer seeds with a mode diameter of 20 μm may conveniently be transformed in two polymerization cycles, first to a mode diameter of 40 μm and then to a mode diameter of 80 μm. Preferably the seeds are expanded this way from 5 to 25 μm to 70 to 90 μm (e.g. in 2 or 3 expansion cycles) and from 70 to 90 μm to 200 to 2000 μm (e.g. in 2 to 5 expansion cycles).

In the process of the invention, step (b) may, but preferably does not, involve removal of over- or under-sized particles from the seed material so produced so as to yield a substantially monodisperse seed material.

The total number of suspension polymerization stages used in the process of the invention will typically be up to 12, preferably up to 8. Typically transition from below 50 μm to above 500 μm will require more than one stage, generally two or more preferably three or four stages. Conveniently, for seeds having sizes above 100 μm the particle volume growth per stage will be at least ×2.74, e.g. at least ×4, and less than ×60, preferably less than ×30, preferably from ×5 to ×25, e.g. ×5 to ×15. For seeds having sizes below 100 μm, the particle volume growth per stage will preferably be between ×2.74 and ×50, e.g. ×4 to ×40 more preferably between ×5 and ×30, especially preferably ×6 to ×15, e.g. about ×8.

If desired, a mixture of two or more populations of substantially monodisperse seeds having different mode diameters may be used in the present invention to produce a multimodal, preferably a bimodal, end product which can be graded relatively straightforwardly to produce different substantially monodisperse grades, e.g. corresponding to EPS grades preferred for different end uses.

By mode particle size is meant the peak particle size for detectable particles, observed in the particle size distribution determined using particle size determination apparatus such as a Coulter LS 130 particle size analyzer e.g. a mode particle size in the distribution of particle size against percentage of total particle volume.

By substantially monodisperse it is meant that for a plurality of particles (e.g. at least 100, more preferably at least 1000) the particles have a coefficient of variation (CV) of less than 20%, for example less than 15%, preferably less than 12%, more preferably less than 11%, still more preferably less than 10% and most preferably no more than about 8%. CV is determined in percentage as $$CV = \frac{100 \times \text{standard deviation}}{\text{mean}}$$

where mean is the mean particle diameter and standard deviation is the standard deviation in particle size. CV is preferably calculated on the main mode, i.e. by fitting a monomodal distribution curve to the detected particle size distribution. Thus some particles below or above mode size may be discounted in the calculation which may for example be based on about 90%, or more preferably about 95%, of total particle number (of detectable particles that is). Such a determination of CV is performable or a Coulter LS 130 particle size analyzer.

The degree of monodispersity required for the seeds and enlarged particles of each enlargement stage tends to vary as enlargement progresses. For the initial and early stage seeds, a high degree of monodispersity is desirable and grading of the product may also be desirable. Thus in general if the product of a polymerization stage has a CV of about 25%, it will preferably be graded to produce a seed having a CV of less than 25%, preferably less than 20% for the subsequent stage. For seeds having a mode size of less than 150 μm, the CV is especially preferably below 5%. For seeds having a mode size of greater than 150 μm the CV is preferably at or below about 10%.

The separate polymerization stages in the process of the invention are characterized by being carried out in different reactor chambers or by being carried out in the same reactor chamber but with addition of further monomer and desirably also further suspension medium. The further monomer is preferably added continuously until the desired amount of monomer has been added. This addition may be at a constant rate but more preferably the rate of addition is increased as addition progresses, with the increase being either gradual or stepwise.

The initial substantially monodisperse polymer seed material used for the processes of the invention may conveniently be produced by any process which yields a substantially monodisperse polymer product, e.g. by a dispersion polymerization process performed in an organic solvent or, more preferably, by the Ugelstad (Sintef) process described for example in U.S. Pat. No. 4,336,173 and U.S. Pat. No. 4,459,378. Monodisperse polymer particles produced by the Sintef process are sold commercially by Dyno Specialty Polymers AS, of Norway under the trade name Dynospheres®, typically with mode particle sizes in the range 2 to 30 μm.

The Ugelstad process is an "activated swelling" process rather than a suspension polymerization because polymerization is only initiated after all the monomer has been absorbed into the starting polymer seeds. In contrast, as described herein, in a seeded suspension polymerization the growing seed is continuously contacting fresh monomer and initiator.

Less preferably, the initial polymer seed material may be produced by a process which yields a polydisperse product, e.g. a conventional suspension polymerization process, with the polydisperse product then being size separated to yield a substantially monodisperse particle population.

The initial monodisperse particles may be transformed into larger substantially monodisperse polymer seeds by a suspension polymerization process substantially as described in U.S. Pat. No. 5,147,937 (Frazza), with the number and duration of the individual polymerization stages being selected to yield a final substantially monodisperse seed product of the desired mode particle size. In general the desired mode particle size for the final seed product will conform to a size from which the final suspension polymerization product may be produced with the desired median particle size in one, or less preferably more than one, polymerization stages in a single reactor. Thus final seed mode sizes may typically be within ±10% of 170 $\mu$m, 340 $\mu$m, 600 $\mu$m and 925 $\mu$m for the manufacture of final product beads of mode sizes 400, 600, 1000 and 1300 $\mu$m, i.e. suitable for use as different grades of EPS beads for example.

It is particularly surprising that the substantial monodispersity of the particles is maintained despite the degree of particle growth that occurs, e.g. multistage growth from initial micron-sized Ugelstad particles up to millimeter sized end product.

It has been found that this multistage growth is advantageous since the polymerization process conditions can be separately optimized for each growth stage, and it allows the final growth stage to be effected using process conditions and controls conventional in the suspension polymerization production of millimeter sized particles.

The performance of the Ugelstad process to generate micron sized initial seeds is relatively time consuming and expensive and the time and expense rises steeply as the size of the particles increases. The commercially available Ugelstad particles are moreover too small to be used in a single step suspension polymerization to produce EPS particles of commercial grades and accordingly such particles did not represent an obvious candidate for use as polymer seeds for EPS, in part due to expense and in part due to the expectation that monodispersity would be lost during the growth process. However, using multistage suspension polymerization to achieve the growth process, not only is the monodispersity substantially retained but also the expense of the Ugelstad process is diluted—thus a 1 g of a 20 $\mu$m Ugelstad product can be transformed into about 275 kg of a 1300 $\mu$m end product.

The processes and products of the invention will now be described in further detail using by way of example the styrene polymerization system. However, as indicated above, while EPS is a particularly important product, the processes are applicable to other polymers and products.

The initial seed particles used are preferably polystyrene particles such as Dynospheres® (Dyno Specialty Polymers AS, Lillestrøm, Norway) produced by the Sintef process, particularly preferably particles having a mode size in the range 0.5 to 50 $\mu$m, especially 5 to 30 $\mu$m, and most especially about 10–20 $\mu$m. Alternatively they may be size fractionated polystyrene particles produced by standard emulsion polymerization procedures, e.g. having a mode size of 0.05 to 1.0 $\mu$m, or polystyrene particles having a mode size of up to 20 $\mu$m, more particularly 1 to 10 $\mu$m, produced by dispersion polymerization in an organic solvent. The initial seed particles may then be enlarged to produce final seed particles having a mode size of up to 1000 $\mu$m in a stepwise suspension polymerization process of which at least one stage involves an activation step as described above. One or more of the polymerization stages may however be substantially as described in U.S. Pat. No. 5,147,937.

The process of U.S. Pat. No. 5,147,937 involves combining an aqueous dispersion of the seed particles with an aqueous emulsion of a water-insoluble monomer or monomer mixture and an oil soluble free radical polymerization initiator or a precursor therefor at such a rate that an amount of monomer or monomer mixture equal to the total initial seed polymer weight is combined with the dispersion over a period of 45 to 120, preferably 60 to 90, minutes. The combination is preferably effected at a temperature at least as high as that at which the initiator or precursor is activated and the reaction mixture is maintained at a temperature at which the initiator or precursor is activated until the seeds have grown by the desired amount, suitably until the monomer is exhausted. The procedure is then repeated until the final desired particle size is achieved.

In the process of the invention, particularly preferably, the monomer content of the reaction mixture is maintained at no more than 20%, more preferably no more than 10%, by weight of the polymer content at any given time.

Preferably each growth stage increases the particle volume by 1.1× to 1000×, e.g. 1.5× to 60×, more preferably 2× to 50×, especially 2× to 30× (e.g. 3× to 30×), more preferably 4× to 30× (e.g. 4× to 25×, or 4× to 20×), and most preferably 6× to 25× (e.g. 6× to 15×). Indeed stages may preferably involve a volume increase of no more than 15× (ie. no more than a fifteen-fold volume increase), especially in the production of smaller particles.

The monomer used may be pure styrene or styrene derivative or may alternatively be a mixture of a styrene and/or a styrene derivative and optionally a non-styrenic comonomer, e.g. a conventional styrene comonomer. Styrene and styrene derivatives such as alkyl styrenes (e.g. $C_{1-3}$-alkyl styrenes such as o-methyl styrene, m-methylstyrene, p-methyl-styrene, dimethyl styrene, ethyl styrene, ethyl-methyl-styrene, etc.) and halo styrenes (e.g. p-chlorostyrene or 2,4-dichlorostyrene), and other conventional or non-conventional styrenes may be used to produce homopolymers or copolymers. In general however styrenes and styrene in particular will preferably be the predominant or indeed the only monomer used for growth from the seed particles.

In one especially preferred embodiment of the process of the invention aminostyrane (especially 4-amino-styrene) is used as a comonomer, particularly preferably in the final suspension polymerization stage. In this way amine-functionalized particles may be produced directly. Such functionalized particles are particularly suitable for use in solid phase organic syntheses, e.g. of peptides and oligonucleotides and small organic molecules, in separations, e.g. in chromatography, and as compatibilizers. The aminostyrene is advantageously used with a styrenic comonomer (e.g. styrene) in a 1:2 to 1:10 weight ratio, especially a 1:2.5 to 1:5 weight ratio. In this embodiment, crosslinking is generally present in the particles formed as a result of exposure to organic solvents in the polymerization process.

Other comonomers which may be used include ethylenically unsaturated monomers for example acrylic acids and esters (such as acrylic acid, methyl acrylate, ethyl acrylate, butylacrylate, methacrylic acid, methyl methacrylate and ethyl methylmethacrylate), maleic acid and esters thereof (e.g. dimethyl maleate, diethyl maleate and dibutyl maleate), maleic anhydride, tumaric acids and esters thereof (e.g.

dimethyl fumarate and diethyl fumarate), vinyl monomers, and acrylonitrile.

Non styrenic comonomers will preferably make up 0% or 1 to 40% by weight of the polymer added in any growth stage. For example, acrylic acid methacrylate comonomers may be used as non-styrenic comonomers, for example ethylene dimethacrylate, (EDMA), hydroxyethylmethacrylate (HEMA), methyl methacrylate (MMA), glycidyl methacrylate (GMA), acrylic acid, methyl acrylate, ethyl acrylate, butylacrylate, methacrylic acid, ethyl methylmethacrylate may be used. however methyl methacrylate may be used as 100% of the monomer.

The seed particles are preferably of a polymer analogous to or at least compatible with the polymer added during the growth stage for which the polymer seed is used. Thus the Ugelstad seeds are preferably predominantly styrenic polymers, especially on the surfaces thereof.

Besides simple ethylenic comonomers, comonomers which are capable of cross-linking can also be used, for example divinyl benzene and polyethylene glycol dimethacrylate. Such cross-linkable comonomers will generally be used in relatively small amounts.

Examples of suitable polymerization initiators include organic peroxides such as dibenzoyl peroxide, and lauroyl peroxide, peroxy esters such as t-butyl peroxybenzoate and t-butyl peroxypivalate and azo compounds such as azo bis isobutyronitrile and azo bisdimethylvaleronitrile. These may be used in conventional concentrations (e.g. 0.1 to 10%, preferably 0.2 to 4%, by weight relative to the monomer), and are preferably added in solution in the monomer or monomer mixture or in an inert organic solvent, e.g. benzene, toluene or dichloropropane. Where an organic solvent is used, this is preferably in a minor amount relative to the polymer content.

It is preferred to use at least one oil soluble polymerization inhibitor which is disposed in the monomer or monomer mixture in order to prevent polymerization in the seed-free monomer droplets and thereby nucleation of new particles. Such an inhibitor preferably has a high molecular weight (e.g. at least 300 Daltons) and low-water-solubility to reduce diffusion through the water phase. The inhibitor may for example be a phenolic compound (such as 3,5-di-tert-butyl-4-hydroxytoluene, 1,1-bis(4-hydroxyphenyl)cyclohexane, 4,4-butylidene-bis(3-methyl-6-t.butyl phenol), 1,3,5-trimethyl-2,4,6-tris-(3,5-di-t.butyl-4-hydroxybenzyl) benzene (available as Irganox 1330), 2,2'-methylenebis(6-t.butyl-4-methyl phenol), a sulphur compound (such as dilaurylthiodipropionate, 4,4'-thiobis(3-methyl-6-t.butyl-phenol)), or an amine (such as N,N'-di-β-naphthyl-p-phenylenediamine and N-phenyl-N-isopropyl-p-phenylenediamine).

The inhibitor is conveniently used in quantities of 0.5 to 10%, preferably 1 to 5 by weight relative to the initiator.

As with conventional suspension polymerizations, it is also preferred to include one or more stabilizers in the reaction medium. It is particularly preferred to include a suspension stabilizer (i.e. a steric stabilizer) in the aqueous seed suspension and an emulsion stabilizer in the aqueous monomer emulsion which is added thereto. Examples of suitable stabilizers include ionic, ethoxylated ionic, non-ionic and polymeric amphiphilic molecules and inorganic particles, e.g. water-soluble high molecular weight. materials, tricalcium phosphate (TCP), celluloses (including cellulose ethers such as alkyl cellulose ethers, especially $C_{1-4}$-alkyl cellulose ethers; and hydroxyalkylalkyl cellulose ethers, especially hydroxy-$C_{1-4}$-alkyl-$C_{1-4}$alkyl cellulose ethers, for example hydroxyalkyl methylcelluloses such as hydroxypropylmethyl celluloses, available for example as Methocel K-100), polyols, polyvinylalcohols, polyalkylene oxides and inorganic materials such as calcium phosphate and magnesium pyrophosphate. Cellulosic ethers and TCP are preferred as suspension stabilizers, especially for the production of larger sized polymer particles. Preferably such stabilizers are present at 10 to 60% w/w, especially 15 to 55% w/w, relative to the initial polymer seed in any polymerization cycle. For cellulose ethers, the stabilizer concentration is conveniently up to 25% w/w, while for inorganic stabilizers such as TCP the stabilizer concentration is advantageously up to 55% w/w, e.g. 1 to 55% w/w, conveniently 30–55% w/w, relative to the initial polymer seed in the polymerization cycle. TCP is especially preferred since it can be used at such high concentrations and since it has low environmental impact.

The emulsion stabilizers may for example be surfactants, e.g. poloxamers or other polyalkylene oxides such as Tweens. Furthermore emulsion stabilizers such as nonylphenol-polyethylene oxides containing 20 to 150 ethylene oxide units, may be used, e.g. Berol 274 or Igepal CO 990. Alternatively ionic or ethoxylated ionic surfactants may be used. These stabilizers are preferably present in the monomer emulsion, e.g. at concentrations of 0.1 to 2%, preferably 0.2 to 1.0% by weight relative to the monomer content.

Preferably the suspension stabilizer used in the final polymerization stage or stages is an inorganic solid particulate, such as a phosphate (e.g. tricalcium phosphate), which can readily be removed from the product in a washing step. Suspension stabilizers will generally be used at 0.5 to 25% by weight relative to the seed.

Typically seed preparation from smaller seeds may be effected in a reactor (e.g. a 0.5 L to 10 L autoclave reactor) equipped with stirrer, inlet and outlet ports and temperature controls.

The reactor is charged with initial or later stage seeds, suspension stabilizer, deionized water and when the seed is small (e.g. below 50 μm, especially below 30 μm) preferably also a water-soluble inhibitor such as sodium nitrate. Where an inhibitor is used in the early stages of particle growth this will typically be used at 0.001 to 0.005% by weight concentration in the water.

The seed is typically up to 6b% by weight, e.g. 1 to 60%, preferably 10 to 60% by weight of the aqueous suspension and the stabilizer typically 0.5 to 15%, preferably 1 to 10% by weight relative to the seed.

The temperature of the seed suspension is typically raised to about 70 to 100° C., preferably 78 to 92° C. and a monomer emulsion is added.

The monomer emulsion is typically prepared by dissolving the oil-soluble initiator and the oil soluble inhibitor (e.g. dibenzoyl peroxide and Irganox 1330) in the styrene monomer (or monomer mixture) and mixing with an aqueous solution of an emulsion stabilizer (e.g. Berol 274 or Igepal CO 990). The oil (monomer) phase desirably makes up 30 to 60% by weight of the monomer emulsion which is prepared by any convenient emulsification technique, e.g. by use of a rotor-stator mixer such as an Ultra-Turax.

Insofar as emulsification is concerned it is particularly important for smaller seeds to ensure that the monomer emulsion droplet size is small, and in general it is preferred that the monomer emulsion droplets should be smaller than the seed particles used in any given stage.

Accordingly, it is preferred to form the emulsion by passing the mixture through a pressure homogenizer or plurality of rotor-stator stages. In this way the production of oversized droplets is minimized. Alternatively the mixture may be passed sequentially through a series of separate rotor-stators or repeatedly cycled through a single rotor-stator mixer.

The monomer or monomer emulsion is then conveniently fed continuously into the stirred suspension in the reactor, preferably using an adjustable feed rate pump. The feed rate is preferably kept at 0.1 to 2.0 g, especially 0.15 to 1.0 g and more especially about 0.15 to 0.8 g, particularly 0.15 to 0.6 g, monomer/hour per gram of polymer in the reactor, i.e. the feed rate is preferably increased during the period of addition. Once monomer addition is complete, the reaction mixture is stirred until monomer is exhausted, e.g. for about 2 hours, or polymerization is brought to an end by addition of a chaser (ie. a monomer composition with a high concentration of initiator) or by increasing the reactor temperature. If desired a second polymerization initiator, activated at a higher temperature than the first, may be used.

At the end of each such polymerization stage, particle sizes are preferably determined (using a Coulter counter) and the quantities of monomer used in any subsequent stage calculated accordingly.

Where a polymerization stage is found to produce an undesirably large particle size distribution, the volume size increase should be reduced for subsequent performances of the same growth stage. However the product may still be used for further growth stages if it is graded to remove overly small or overly large particles.

After polymerization is complete, the enlarged particles may be removed and if desired washed to remove undesired stabilizers, Initiator etc.

The stability of the polymerization suspension, and the molecular weight of the polymer produced depend on a range of variables (e.g. rate of monomer addition, initiator concentration, temperature, emulsion droplet size, seed size, etc.) in different ways.

Stability requires the avoidance of coagulation. This can typically be assured by ensuring that the monomer concentration in the seed particles does not exceed about 20–25% by weight, more preferably it does not exceed about 10 to 20% and especially preferably it does not exceed about 10% by weight. Avoidance of excess monomer concentration can be achieved by increasing initiator concentration (although this reduces the molecular weight of the polymer formed, the viscosity of the polymer and its glass transition temperature) or by reducing the rate of monomer addition (which increases polymer molecular weight and reaction time). Essentially therefore the operation of the process must balance initiator concentration and monomer addition rate to avoid coagulation and achieve the desired molecular weight within an acceptable process time.

The water contents of the phases may be varied generally without serious problems although if the suspension phase has too low a water content stability may be lost.

Likewise emulsifier, ie. emulsion stabilizer, content is generally not critical, although if too low stability is lost, and if too high micelle formation and hence fines formation may occur. In general the process of the invention may be operated with less than about 1% by weight fines being produced.

From a starting point of typically 10–20 $\mu$m Dynospheres®, magnification to full sized particles of for example 200 to 1300 $\mu$m mode size may typically be effected in 5 or more stages, e.g.

Stage 1—10 to 40 $\mu$g, e.g. 20 to 40 $\mu$m
Stage 2—40 to 80 $\mu$m
Stage 3—80 to 250 $\mu$m, e.g. 80 to 200 $\mu$m
Stage 4—200 to 650 $\mu$m, e.g. 200 to 400 $\mu$m or 250 to 650 $\mu$m
Stages 5 et seq.—400 to 2000 $\mu$m, e.g. 400 to 600 $\mu$m or up to 1300 $\mu$m or 650 to 1700 $\mu$m To produce EPS beads, the PS beads must be loaded with a blowing agent, ie. a material which is not a solvent for the polymer or which only slightly swells it and has a boiling point lower than the softening point of the polymer and is in gaseous or liquid form at ambient temperatures or which is a solid capable of generating a gas. Typically an optionally substituted aliphatic hydrocarbon having up to 8 carbons, preferably 3 to 5 carbons, and a boiling point in the range −50 to +50° C. is used, e.g. propane, pentane, cyclopentane, cyclobutane, methyl chloride, ethyl chloride, dichlorodifluoromethane (or other Freons), propylene, butylene, etc. Pentane or butane is preferred. The blowing agent is typically added during the final polymerization stage or stages or to the final polymerization product, optionally after recovery, washing, drying, etc. Mixtures of blowing agents can be used.

If desired, the particles may also be treated with a flame-retardant, e.g. hexabromocyclododecane, or they may be surface treated to attach other materials with a desired property, e.g. antistatic additives, or functional and reactive chemical groups.

Besides being useful for the preparation of EPS beads, the processes of invention may be used to produce polymer beads for many other applications. In particular, substantially monodisperse particles suitable for use as ion exchange resins (e.g. for water purification) may be prepared. Such resin beads will generally require some degree of cross-linking (e.g. with divinyl benzene) of the polymer matrix and may be derivatised after bead formation has occurred, e.g. by sulphonation by treatment with sulphuric acid to produce acidic ion exchange resin beads or by amination of a reactive comonomer used in the final stage or one of the later stages of polymerization, e.g. chloromethylstyrene, to produce a basic ion exchange resin. Such resins would have the advantage that with repeated use and flushing there would be a lesser tendency towards bead size separation occurring in the resin bed, a problem which leads to reduced performance. In general for ion exchange usage, bead sizes will be about 100 to 500 $\mu$m.

Further examples of applications include use as substrates for the generation of combinatorial chemistry libraries where the substantial monodispersity of the particles gives improved distribution of library members in library generation using split and mix techniques. For this application, unless an appropriately functionalized comonomer (e.g. aminostyrene) has been used in the production of the beads, the beads will generally be reacted post production to introduce a surface functionality appropriate for attachment of the library members. Again bead sizes of 100 to 500 $\mu$m might typically be used.

The beads produced according to the invention may also be used as pigments or additives for paints (e.g. to replace $TiO_2$), as spacers (e.g. in LCD's), as friction reducers, as lubricants, as carriers for cells, enzymes or catalysts, as carriers for drugs for sustained release formulations, as filters, as micro lenses, as carriers for additives for adhesives, as flow markers, or they may be thermoformed, e.g. by sintering, to produce filters or filter cakes with high uniformity of porosity.

The particles may also be used as an additive in other polymers, particularly polyolefins such as polyethylene and polypropylene, polycarbonates, ABS, and polystyrenes (e.g. GPPS and HIPS). Addition of particles with low molecular weight may be done to improve flow properties, e.g. to increase melt flow index, or to modify the molecular weight distribution.

For many of these uses, a degree of porosity is required for the particles, e.g. when they are for use as catalyst or enzyme carriers. This may be achieved relatively simply by controlling the degree of cross-linking of the polymer matrix and by including a porogen (e.g. toluene, pentane or any other volatile or gas generating agent which is non-reactive with the polymer) in the monomer emulsion used in the final stage or one of the later polymerization stages.

Where desired a porous particle may be loaded, e.g. with drug, catalyst, enzyme or the like, and then provided with a further polymer layer to seal in the load or to delay its release.

Porous particles may be used not simply as carriers but also as a source of controlled porosity in ceramics, polymer membranes, etc.

All documents referred to herein are hereby incorporated by reference.

The invention will now be described further with reference to the following non-limiting Examples and to the accompanying drawings in which.

EXAMPLE 1

Figure 1:
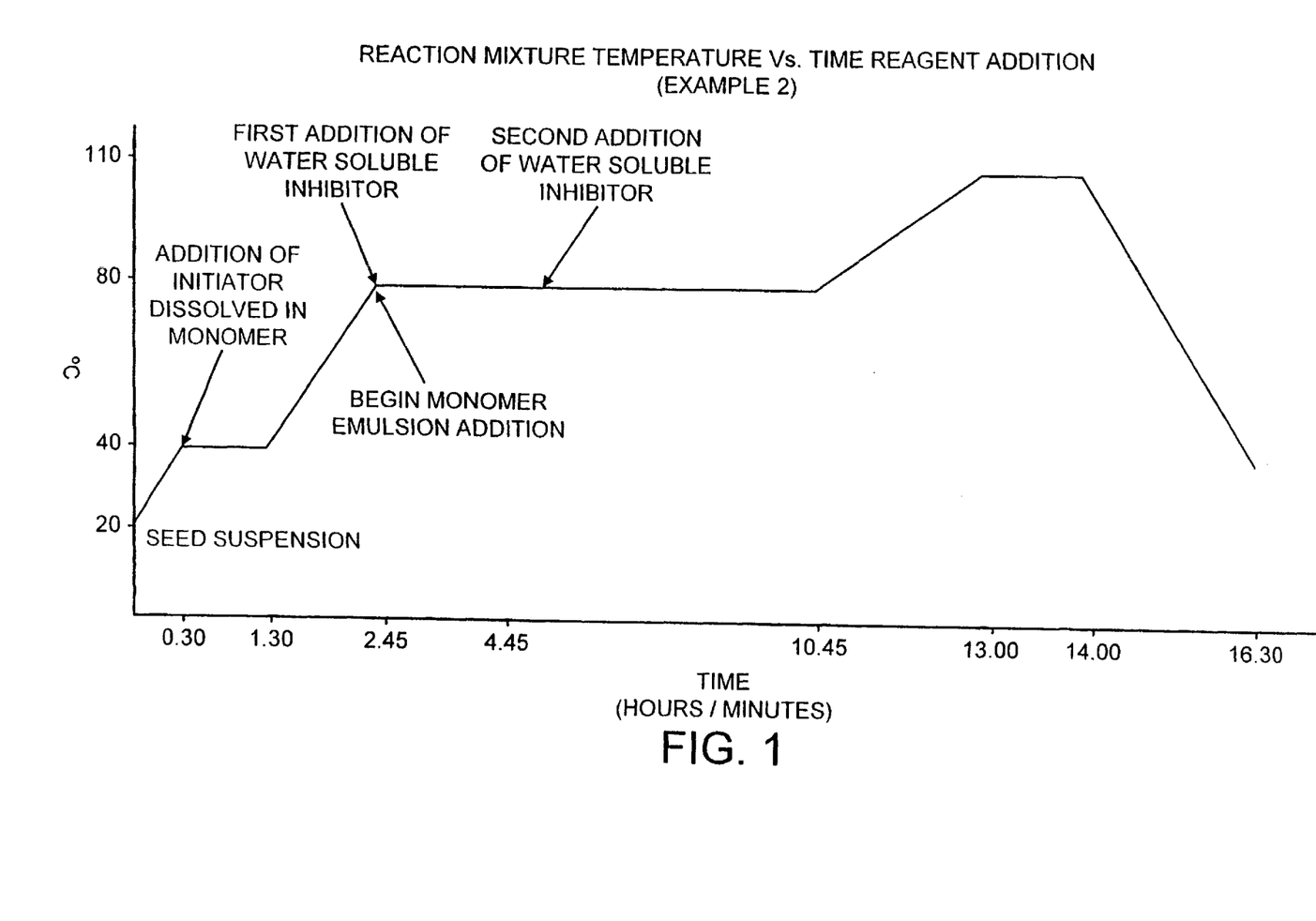
FIG. 1 is a diagram showing reaction mixture temperature against time and indicating the stages at which different reagents are added in Example 2.
Figure 2:
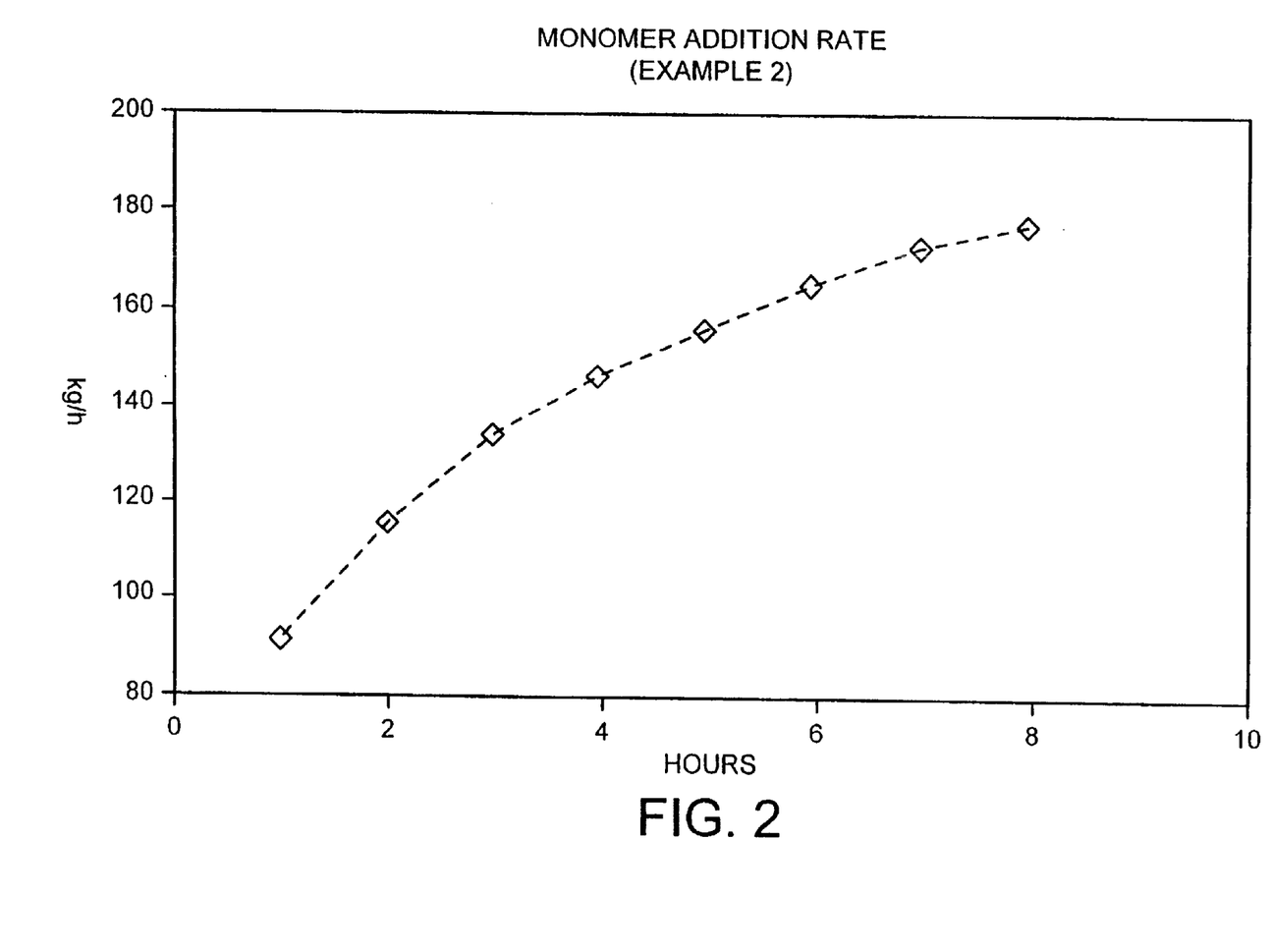
FIG. 2 is a plow showing monomer addition rare over time in Example 2.

A reactor was charged with 1929 kg of an aqueous suspension of 55 kg 20 μm polystyrene Dynospheres®, 18 kg of cellulose ether (Methocel K100) (pre-dissolved in water) and 1600 kg water. The suspension was stirred at 40 rpm and heated to 40° C. over ½ hour.

1.0 kg dibenzoyl peroxide (75% in water) was dissolved in 10 kg styrene in a 10 L vessel using a conventional propellor as an agitator. After complete dissolution this was charged to the reactor. The suspension was kept at 40° C. for 1 hour then raised to 80° C. over 1½ hours.

A styrene monomer emulsion was prepared by mixing 385 kg styrene, 3.0 kg benzoyl peroxide (75% in water) for 30 minutes. Then 770 kg water and 1.66 kg Tween 20 stabilizer were added and the mixture was emulsified and added to the reactor over 8 hours at rates of 90.75 kg/h, 115.09 kg/h, 133.5 kg/h, 146.3 kg/h, 156.2 kg/h, 165 kg/h, 173 kg/h and 177.5 kg/h for one hour each.

After 10 minutes at 80° C., the reactor was charged with 5 g KI dissolved in 12.5 g water and after 2 hours at 80° C. a further 15 g KI dissolved in 37.5 g water was added.

After the polymerization reaction was complete, the reaction mixture was held at 80° C. for a further 2 hours.

The product was recovered and analysed for particle size-distribution using a Coulter Counter 256.

Mode diameter: 39–41 μm

CV: 5–6%

EXAMPLE 2

A reactor was charged with 1929 kg of an aqueous suspension of 50 kg of the 40 μm particles of Example 1, 11 kg of cellulosic ether (Methocel K100), and 1863 kg water. The cellulosic ether was pre-dissolved in water.

The suspension was stirred at 40 rpm and heated to 4° C. over ½ hour.

0.25 kg dibenzoyl peroxide (75% w/w in water) was dissolved in 10 kg styrene and mixed in with the suspension.

The suspension/emulsion was kept at 40° C. for 1 hour then raised to 80° C. over 1¼ hour.

A styrene monomer emulsion was prepared by mixing 385 kg styrene, 770 kg water, 1.66 kg Tween 20 stabilizer, 0.4 kg Trigonox and 3.0 kg of dibenzoylperoxide (75% an water). This was emulsified and added to the reactor over 8 hours at a rate of 90.75 kg/h (1 hour), 115.09 kg/h (1 hour), 133.50 kg/h (1 hour), 146.26 kg/h (1 hour), 156.14 kg/h (1 hour), 165.38 kg/h (1 hour), 173.04 kg/h (1 hour) and 177.50 kg/h (1 hour). The reaction mixture was then heated 110° C. over 2¼ hours, maintained at 110° C. for 1 hour and then cooled. At the beginning of monomer emulsion addition and 2 hours thereafter 5 g KI in 50 g water was added.

The product was recovered and analysed for particle size distribution.

Mode diameter: 79–81 μm

CV: 5–6%

EXAMPLE 3

A reactor was charged with 1359 kg seed of an aqueous suspension of 70 kg Dynoseeds 40 (i.e. 40 μm monosized polystyrene seed, available from Dyno Specialty Polymers AS). The suspension was stirred as 40 rpm.

Tri-calcium phosphate (TCP) 14 kg, and Nacconol G90 (alkyl aryl sulfonate) 0.039 kg was charged directly to the reactor and the suspension was heated to 40° C.

2.8 kg di-benzoyl peroxide (75% wt. in water) was dissolved in 20 kg styrene in a glass reactor. At 40° C. in the polymerisation reactor this solution was charged to the reactor. The suspension was kept at 40° C. for 1 hour and then raised to 80° C. during approximately 1 hour.

470 kg styrene and 5.5 kg di-benzoyl peroxide (BPO) (75% in water) was mixed together for 1 hour. When the temperature at the reactor was 80° C. this Styrene/BPO solution was added to the reactor over 5 hours at a constant rate.

After 3 hours at 80° C. the reactor was charged with 10 kg tri-calcium phosphate and 0.028 kg Nacconol G90.

The temperature was kept at 80° C. for further 2 hours after the charging of Styrene/BPO was completed. The residual monomer content was approximately 3%.

The product was recovered and analysed.

Results:

| | |
|---|---|
| Mode diameter | 79,5 μm |
| Appearance | TCP present |
| CV (main peak) | 8.9% (Coulter LS) |
| Molecular weight | 86800 |
| Mw/Mn | 2.47 |
| Melt Flow Rate | 150 g/10 min. (200° C., 3 kg) |

EXAMPLE 4

A reactor was charged with 274 kg seed of an aqueous suspension of 60 kg Dynoseeds 40 (40 μm monosized polystyrene seed) and a stabiliser solution of 12 kg Methocel K-100 and 1493 kg water. The suspension was stirred at 40 rpm and heated co 40° C.

1.47 kg di-benzoyl peroxide (75% in water) was dissolved in 8.8 kg styrene in a glass reactor. At 40° C. in the polymerisation reactor this solution was charged to the reactor. The suspension was kept at 40° C. for 1 hour and then raised to 80° C. during approximately 1 hour.

A styrene monomer emulsion was prepared by mixing 353 kg styrene and 5.1 kg di-benzoyl peroxide (75% in water), 708 kg water and 1.52 kg Tween 20. When the temperature was 80° C. at the reactor this emulsion was added to the reactor over 5 hours at a constant rate.

After 10 minutes at 80° C. the reactor was charged with 5 g KI dissolved in water.

After 3 hours at 80° C. the reactor was charged with 15 gram KI dissolved in water.

The temperature was kept at 80° C. for further 2 hours after the charging of the emulsion was completed. The residual monomer content was approximately 1.5%.

The product was recovered and analysed.
Results:

| | |
|---|---|
| Mode diameter | 83.3 μm |
| CV (mainpeak) | 7.9% (Coulter LS) |
| Molecular weight | 99700 |
| Mw/Mn | 2.55 |
| Melt Flow Rate | 100 g/10 min (200° C., 8 kg) |

The beads of Examples 3 and 4 were added to samples of polypropylene, polyethylene, polycarbonate and ABS (acrylonitrile/polybutadiene/styrene): in all cases the addition of 5% wt. beads resulted in significant increase in the melt flow index.

EXAMPLE 5

A reactor was charged with 556 kg seed of an aqueous suspension of 70 kg Dynoseeds 40 (40 μm polystyrene seed). The suspension was stirred at 40 rpm.

Tri-calcium phosphate and Nacconol G90 (alkyl aryl sulfonate) was charged directly to the reactor and the suspension was heated to 40° C.

2.8 kg di-benzoyl peroxide (75% in water) was dissolved in 20 kg styrene in a glass reactor. At 40° C. in the polymerisation reactor this solution was charged to the reactor. The suspension was kept at 40° C. for 1 hour and then raised to 8° C. over approximately 1 hour.

A styrene monomer solution was prepared by mixing 470 kg styrene and 1.68 kg di-benzoyl peroxide (BPO) (75% in water) for 1 hour. When the temperature at the reactor was 80° C. this Styrene/BPO solution was added to reactor over 5 hours at a constant rate.

After 3 hours at 80° C. the reactor was charged with 10 kg tri-calcium phosphate and 0.025 kg Nacconol G90.

The temperature was kept at 80° C. for further 2 hours after the charging of Styrene/BPO was completed. The residual monomer content was approximately 3.5%.

The product was recovered and analysed.
Results:

| | |
|---|---|
| Mode diameter | 81.1 μm |
| CV (main peak) | 9.4% (Coulter LS) |
| Molecular weight | 132000 |
| Mw/Mn | 2.47 |
| Residual Styrene | 3.7% |

What is claimed is:

1. A process for the preparation of monodisperse polymer particles having a mode particle size of at least 120 μm, the process comprises the steps of:

obtaining a first particulate polymer seed material having a first mode particle diameter of no more than 50 μm;

using the first particulate polymer seed material, performing a polymerization to yield a second particulate polymer seed material having a second mode particle diameter greater than the first mode particle diameter; and using the second particulate polymer seed material, performing at least one further polymerization to yield polymer particles having a mode particle size of at least 120 μm;

wherein at least one of the polymerizations comprises the steps of:

forming an aqueous dispersion comprising a particulate polymer seed material, an organic compound which has a molecular weight of less than 5000 Daltons and a water solubility of less than $10^{-2}$ g/L at 25° C., and a stabilizer;

allowing the organic compound to diffuse into the particulate polymer seed material to produce an activated seed material;

contacting the activated seed material with a monomer and a polymerization initiator; and effecting polymerization.

2. The process of claim 1, wherein the seed material has a mode particle diameter of no more than 40 μm.

3. The process of claim 1, wherein the seed material has a mode particle diameter of no more than 30 μm.

4. The process of claim 1, wherein there is an increase in mode particle diameter between the polymer particles and the seed material of at least ×4.

5. The process of claim 1, wherein there is an increase in mode particle diameter between the polymer particles and the seed material of at least ×10.

6. The process of claim 1, further comprising the step of impregnating the polymer particles with a blowing agent.

7. The process of claim 6, further comprising the step of expanding the polymer particles.

8. The process of claim 1, wherein the aqueous dispersion comprises a water-soluble polymerization inhibitor.

9. The process of claim 8, wherein the inhibitor is potassium iodide.

10. The process of claim 1, wherein an inhibitor is added to the aqueous dispersion during polymerization.

11. The process of claim 1, further comprising performing at least one further suspension polymerization.

12. The process of claim 1, wherein there is an increase in mode particle diameter between the polymer particles and the seed material of at least ×2.

13. The process of claim 1, further comprising the step of impregnating the polymer particles.

14. The process of claim 1, further comprising the step of heat treating the polymer particles.

15. The process of claim 1, further comprising the step of surface modifying the polymer particles.

16. The process of claim 1, wherein the aqueous dispersion further comprises an organic solvent.

17. The process of claim 1, wherein the step of allowing the organic compound to diffuse into the particulate polymer seed material is effected in less than 120 minutes.

\* \* \* \* \*